United States Patent
Oren et al.

(10) Patent No.: US 10,149,313 B2
(45) Date of Patent: Dec. 4, 2018

(54) APPARATUS, SYSTEM AND METHOD OF COMMUNICATING IN A NEIGHBOR AWARENESS NETWORKING (NAN) CLUSTER

(71) Applicant: INTEL IP CORPORATION, Santa Clara, CA (US)

(72) Inventors: Elad Oren, Tel Aviv (IL); Po-Kai Huang, Santa Clara, CA (US); Emily H. Qi, Camas, WA (US)

(73) Assignee: INTEL IP CORPORATION, Santa Clara, CA (US)

( * ) Notice: Subject to any disclaimer, the term of this patent is extended or adjusted under 35 U.S.C. 154(b) by 145 days.

(21) Appl. No.: 14/757,981

(22) Filed: Dec. 26, 2015

(65) Prior Publication Data
US 2017/0026991 A1     Jan. 26, 2017

Related U.S. Application Data

(60) Provisional application No. 62/195,393, filed on Jul. 22, 2015.

(51) Int. Cl.
*H04W 72/12* (2009.01)
*H04L 12/733* (2013.01)
(Continued)

(52) U.S. Cl.
CPC ......... *H04W 72/1263* (2013.01); *H04L 45/20* (2013.01); *H04W 4/06* (2013.01);
(Continued)

(58) Field of Classification Search
CPC .. H04L 45/20; H04L 67/104–67/1093; H04W 4/005–4/006; H04W 4/08; H04W 4/20; H04W 4/206; H04W 8/005; H04W 8/22–8/245; H04W 28/0247; H04W 28/10–28/14; H04W 40/02; H04W 40/24; H04W 48/16; H04W 48/18; H04W 56/00–56/0025; H04W 72/00–72/14; H04W 74/002; H04W 74/08;
(Continued)

(56) References Cited

U.S. PATENT DOCUMENTS

2009/0073924 A1   3/2009 Chou
2015/0023267 A1   1/2015 Lim et al.
(Continued)

OTHER PUBLICATIONS

Wi-Fi Neighbor Awareness Networking (NAN), Technical Specification, Version 1.0, May 1, 2015, 98 pages.*
(Continued)

*Primary Examiner* — Timothy J Weidner
(74) *Attorney, Agent, or Firm* — Shichrur & Co.

(57) ABSTRACT

Some demonstrative embodiments include apparatuses, systems and/or methods of communicating in an awareness cluster. For example, an apparatus may include logic and circuitry configured to cause a first Neighbor Awareness Networking (NAN) device to communicate during one or more Discovery Windows (DWs) of a NAN cluster; to setup a NAN Data link (NDL) with a second NAN device of the NAN cluster, the NDL belonging to a NAN Data Cluster (NDC) having a NDC base schedule; and to communicate data with the second NAN device via the NDL according to the NDC base schedule.

23 Claims, 3 Drawing Sheets

(51) Int. Cl.
*H04W 4/06* (2009.01)
*H04W 8/00* (2009.01)
*H04W 8/24* (2009.01)
*H04W 28/12* (2009.01)
*H04W 40/24* (2009.01)
*H04W 48/16* (2009.01)
*H04W 56/00* (2009.01)
*H04W 74/00* (2009.01)
*H04W 84/12* (2009.01)
*H04W 84/18* (2009.01)
*H04W 88/02* (2009.01)
*H04W 88/04* (2009.01)
*H04W 92/18* (2009.01)

(52) U.S. Cl.
CPC .............. *H04W 8/005* (2013.01); *H04W 8/24* (2013.01); *H04W 28/12* (2013.01); *H04W 40/24* (2013.01); *H04W 48/16* (2013.01); *H04W 56/0015* (2013.01); *H04W 72/1205* (2013.01); *H04W 72/1278* (2013.01); *H04W 74/002* (2013.01); *H04W 84/12* (2013.01); *H04W 84/18* (2013.01); *H04W 88/02* (2013.01); *H04W 88/04* (2013.01); *H04W 92/18* (2013.01)

(58) Field of Classification Search
CPC ..... H04W 76/02; H04W 84/02; H04W 84/12; H04W 84/18–84/22; H04W 88/02; H04W 92/18
See application file for complete search history.

(56) References Cited

U.S. PATENT DOCUMENTS

| | | |
|---|---|---|
| 2015/0036540 A1 | 2/2015 | Kasslin et al. |
| 2015/0109981 A1 | 4/2015 | Patil et al. |
| 2015/0172902 A1* | 6/2015 | Kasslin ................ H04W 8/005 370/328 |
| 2016/0309493 A1* | 10/2016 | Shmukler .......... H04W 76/043 370/348 |
| 2016/0353470 A1* | 12/2016 | Liu .................... H04W 72/121 455/434 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wi-Fi Neighbour Awareness Networking (NAN), Technical Specification,Version 1.0, May 1, 2015, 98 pages.
Wi-Fi Peer-to-Peer (P2P), Technical Specification, Version 1.5, 2014, Aug. 4, 2014, 183 pages.
International Search Report and Written Opinion for PCT/US2016/038630, dated Sep. 29, 2016, 10 pages.
Ericsson, 'On Scheduling Assignments and Receiver Behaviour', R1-141391, 3GPP TSG-RAN WG1 Meeting #76bis, Shenzhen, China, Mar. 21, 2014, 6 pages.
International Preliminary Report on Patentability for PCT/US2016/038630, dated Feb. 1, 2018, 7 pages.

* cited by examiner

APPARATUS, SYSTEM AND METHOD OF COMMUNICATING IN A NEIGHBOR AWARENESS NETWORKING (NAN) CLUSTER

CROSS REFERENCE

This application claims the benefit of and priority from U.S. Provisional Patent Application No. 62/195,393 entitled "Apparatus, System and Method of Communicating According to A Base Schedule of a NAN Data Cluster", filed Jul. 22, 2015, the entire disclosures of which are incorporated herein by reference.

TECHNICAL FIELD

Embodiments described herein generally relate to communicating in a Neighbor Awareness Networking (NAN) Cluster.

BACKGROUND

Awareness networking, for example, according to a Wireless Fidelity (Wi-Fi) Aware Specification, may enable wireless devices, for example, Wi-Fi devices, to perform device/service discovery, e.g., in their close proximity.

The awareness networking may include forming a cluster, e.g., a Wi-Fi Aware cluster, for devices in proximity. Devices in the same Wi-Fi Aware cluster may be configured to follow the same time schedule, e.g., a discovery window (DW), for example, to facilitate cluster formation and/or to achieve low power operation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc, indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc, to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including *Wi-Fi Neighbor Awareness Networking (NAN) Technical Specification, Version* 1.0, May 1, 2015) and/or future versions and/or derivatives thereof, devices and/or networks operating in accordance with existing WFA Peer-to-Peer (P2P) specifications (*WiFi P2P technical specification, version* 1.5, Aug. 4, 2014) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing IEEE 802.11 standards (IEEE 802.11-2012, *IEEE Standard for Information technology—Telecommunications and information exchange between systems Local and metropolitan area networks—Specific requirements Part* 11: *Wireless LAN Medium Access Control (MAC) and Physical Layer (PHY) Specifications*, Mar. 29, 2012; IEEE802.11ac-2013 ("*IEEE P802.11ac-2013, IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 4: Enhancements for Very High Throughput for Operation in Bands below 6 *GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: Enhancements for Very High Throughput in the 60 *GHz Band*", 28 December, 2012); and/or IEEE-802.11REVmc ("*IEEE* 802.11-*REVmc*™/*D*3.0, June 2014 *draft standard for Information technology—Telecommunications and information exchange between systems Local and metropolitan area networks Specific requirements; Part* 11: *Wireless LAN Medium Access Control (MAC) and Physical Layer (PHY) Specification*")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Figure 1:
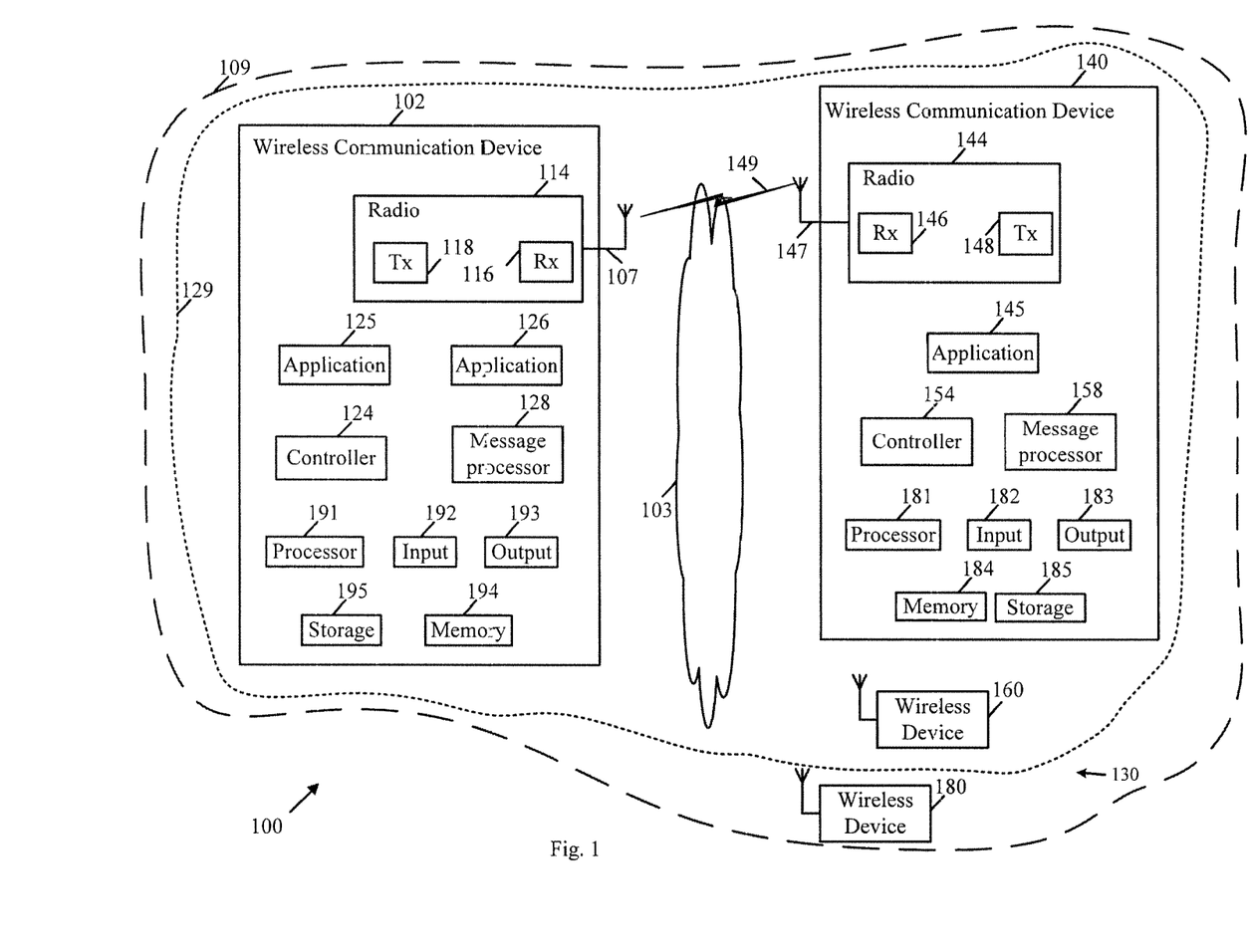
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, devices 102, 140, 160 and/or 180 may include, operate as, and/or perform the functionality of one or more location measurement STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, devices 102, 140, 160 and/or 180 may include, operate as, and/or perform the functionality of any other devices and/or STAs.

In some demonstrative embodiments, devices 102, 140, 160 and/or 180 may be configured to operate as, and/or to perform the functionality of, an access point (AP) STA.

In some demonstrative embodiments, devices 102, 140, 160 and/or 180 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In one example, device 102 may be configured to operate as, and/or to perform the functionality of an AP STA, and/or device 140 may be configured to operate as, and/or to perform the functionality of a non-AP STA.

In some demonstrative embodiments, device 102 may include, for example, one or more of a processor 191, an input unit 192, an output unit 193, a memory unit 194, and/or a storage unit 195; and/or devices 140, 160 and/or 180 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include at least one radio 114, and/or device 140 may include at least one radio 144.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may be configured to communicate over a 2.4 GHz band, a 5 GHz band, an mmWave band, a SIG band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 140, 160 and/or 180 may form, and/or may communicate as part of, a wireless local area network (WLAN).

In some demonstrative embodiments, wireless communication devices 102, 140, 160 and/or 180 may form, and/or may communicate as part of, a WiFi network.

In some demonstrative embodiments, wireless communication devices 102, 140, 160 and/or 180 may form, and/or may communicate as part of, a WiFi Direct (WFD) network, e.g., a WiFi direct services (WFDS) network, and/or may perform the functionality of one or more WFD devices.

In one example, wireless communication devices 102, 140, 160 and/or 180 may include, or may perform the functionality of a WiFi Direct device.

In some demonstrative embodiments, wireless communication devices 102, 140, 160 and/or 180 may be capable of performing awareness networking communications, for example, according to an awareness protocol, e.g., a WiFi aware protocol, and/or any other protocol, e.g., as described below.

In some demonstrative embodiments, wireless communication devices 102, 140, 160 and/or 180 may be capable of forming, and/or communicating as part of, a Neighbor Awareness Networking (NAN) network, e.g., a WiFi NAN or WiFi Aware network, and/or may perform the functionality of one or more NAN devices ("WiFi aware devices").

In some demonstrative embodiments, wireless communication medium 103 may include a direct link, for example, a PTP link, e.g., a WiFi direct P2P link or any other PTP link, for example, to enable direct communication between wireless communication devices 102, 140, 160 and/or 180.

In some demonstrative embodiments, wireless communication devices 102, 140, 160 and/or 180 may perform the functionality of WFD P2P devices. For example, devices 102, 140, 160 and/or 180 may be able to perform the functionality of a P2P client device, and/or P2P group Owner (GO) device.

In other embodiments, wireless communication devices 102, 140, 160 and/or 180 may form, and/or communicate as part of, any other network, and/or may perform the functionality of any other wireless devices or stations.

In some demonstrative embodiments, devices 102, 140, 160 and/or 180 may include one or more applications configured to provide, share, and/or to use one or more services, e.g., a social application, a file sharing application, a media application and/or the like, for example, using an awareness network, NAN network ("WiFi Aware network"), a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102, 140, 160 and/or 180 may be capable of sharing, showing, sending, transferring, printing, outputting, providing, synchronizing, and/or exchanging content, data, and/or information, e.g., between applications and/or services of devices 102, 140, 160 and/or 180 and/or one or more other devices.

In some demonstrative embodiments, devices 102, 140, 160 and/or 180 may include a controller configured to control one or more functionalities of devices 102, 140, 160 and/or 180, for example, one or more functionalities of communication, e.g., awareness networking communications, WiFi Aware (NAN) communication and/or any other communication, between devices 102, 140, 160 and/or 180 and/or other devices, and/or any other functionality, e.g., as described below. For example, device 102 may include a controller 124, and/or device 140 may include a controller 154.

In some demonstrative embodiments, controller 124 may be configured to perform one or more functionalities, communications, operations and/or procedures between wireless communication devices 102, 140, 160 and/or 180, and/or one or more other devices, e.g., as described below.

In some demonstrative embodiments, controller 124 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In one example, controller 124 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In one example, controller 154 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In one example, message processors 128 and/or 158 may perform one or more functionalities of a NAN MAC configured to generate, process and/or handle one or more NAN messages, e.g., NAN Beacon frames and/or NAN Service Discovery frames.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124, radio 114, and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In some demonstrative embodiments, at least part of the functionality of message processor 158 may be implemented as part of radio 144.

In some demonstrative embodiments, at least part of the functionality of message processor 158 may be implemented as part of controller 154.

In other embodiments, the functionality of message processor 158 may be implemented as part of any other element of device 140.

In some demonstrative embodiments, at least part of the functionality of controller 154, radio 144, and/or message processor 158 may be implemented by an integrated circuit, for example, a chip, e.g., a System in Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In some demonstrative embodiments, devices 102, 140, 160 and/or 180 may perform the functionality of a device or station, for example, an awareness networking device, a NAN device, a WiFi device, a WiFi Aware device, a WFD device, a WLAN device and/or any other device, capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a WiFi Aware discovery scheme ("NAN discovery scheme"), and/or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., wireless communication devices 102, 140, 160 and/or 180, may include one or more blocks and/or entities to perform network awareness functionality. For example, a device, e.g., devices 102, 140, 160 and/or 180, may be capable of performing the functionality of a NAN device, may include a NAN MAC and/or a Discovery Engine (DE). In one example, controllers 124 and/or 154 may be configured to perform the functionality of the discovery engine, and/or message processors 128 and/or 158 may be configured to perform the functionality of the NAN MAC, e.g., as described above. In another example, the functionality of the NAN MAC and/or the Discovery engine may be performed by any other element and/or entity of devices 102, 140, 160 and/or 180.

In some demonstrative embodiments, the awareness networking scheme may include a discovery scheme or protocol, e.g., as described below.

In some demonstrative embodiments, devices 102, 140, 160 and/or 180 may perform a discovery process according to the awareness networking scheme, for example, to discover each other and/or to establish a wireless communication link, e.g., directional and/or high throughput wireless communication link and/or any other link.

In some demonstrative embodiments, devices 102, 140, 160 and/or 180 may be configured to enable time synchronization between devices 102, 140, 160, 180 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 140, 160 and/or 180, so that STAs can find each other more efficiently during a DW.

In some demonstrative embodiments, devices of an awareness network, e.g., a NAN network, may form one or more clusters, e.g., in order to publish and/or subscribe for services. A NAN cluster may be defined by an Anchor Master (AM) (also referred to as a "NAN master device" or "anchor device"). In one example, the AM may include a NAN device, which has the highest rank in the NAN cluster.

In some demonstrative embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of devices 102, 140, 160 and/or 180, e.g., device 102, may perform the functionality of an AM. The AM may be configured to transmit one or more beacons. Another one of devices 102, 140, 160 and/or 180, e.g., device 140, may be configured to receive and process the beacons.

In one example, devices 102, 140, 160 and/or 180 may perform the functionality of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102, 140, 160 and/or 180 may be configured to discover one another over a predefined communication channel ("the social channel"). In one example, the Channel 6 in the 2.4 GHz band may be defined as the NAN social channel. Any other channel may be used as the social channel.

In some demonstrative embodiments, devices 102, 140, 160 and/or 180 may transmit discovery frames, e.g., SDFs, during the plurality of DWs, e.g., over the social channel. For example the NAN AM may advertise the time of the DW, during which NAN devices may exchange SDFs.

In one example, devices 102, 140, 160 and/or 180 may transmit the discovery frames to discover each other, for example, to enable using the one or more services provided by applications 125 and/or 126.

In some demonstrative embodiments, devices 102, 140, 160 and/or 180 may communicate during a DW according to a contention mechanism. For example, devices 102, 140, 160 and/or 180 may check whether or not a channel is unoccupied prior to an attempt to transmit a discovery frame during the discovery window.

In some demonstrative embodiments, a device of devices 102, 140, 160 and/or 180, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of flame.

In some demonstrative embodiments, the discovery frame may nut require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102, 140, 160 and/or 180, to advertise its availability, for example, in terms of at least one channel and one or more timeslots, during which the device may be available, e.g., active ("awake"), for example, to perform post NAN activities.

In one example, the availability information may be communicated as part of an Availability Attribute, e.g., including a 32-bit bitmap for 32 timeslots, for example, wherein each timeslot is 16 milliseconds (ins) long. For example, each bit that is not zero may represent a timeslot, during which a device sending the Availability Attribute is to be awake and available to send and/or receive data in a specified method.

In some demonstrative embodiments, device 102 may be part of an awareness cluster, e.g., a NAN cluster 109.

In some demonstrative embodiments, NAN cluster 109 may include one or more other NAN devices 130.

In one example, one or more NAN devices 130 may include devices 140, 160 and/or 180.

In another example, one or more NAN devices 130 may include any other NAN devices of NAN cluster 109.

In some demonstrative embodiments, devices 102, 140, 160 and/or 180 may be configured to communicate according to a Wi-Fi Aware specification and/or any other awareness networking specification, which may be configured to allow a group of devices to discover other devices/services nearby and/or in close proximity, e.g., with low power.

In some demonstrative embodiments, devices 102, 140, 160 and/or 180 may form NAN cluster 109 and may synchronize to the same clock, e.g., as described above.

In one example, all devices of the same cluster, e.g., NAN cluster 109, may converge on a time period and channel, e.g., a DW, to facilitate the discovery of services of devices 102, 140, 160 and/or 180, and/or to achieve low power consumption, e.g., as described above.

In some demonstrative embodiments, devices 102, 140, 160 and/or 180 may be configured to enable data transmission for a specific service among multiple devices, post service discovery.

In some demonstrative embodiments, to enable data transmission post service discovery the two devices may be required to use a common schedule, e.g., to be available at a same channel at a same time.

In some demonstrative embodiments, device 102 may be configured to determine the schedule for data transmission post service discovery with other devices 130, for example, based on a base schedule, e.g., as described below.

In some demonstrative embodiments, devices 102, 140, 160 and/or 180 may be configured to utilize schemes, which may enable devices 102, 140, 160 and/or 180 to transmit data to each other, e.g., without any infrastructure, e.g., directly.

In some demonstrative embodiments, device 102 and/or device 140 may establish a Service Data Session (SDS), for example, to communicate, e.g., directly, between devices 102 and 140.

In some demonstrative embodiments, during the SDS, devices 102 and 140 may set up a NAN data link (NDL) 149, e.g., to support the SDS and/or one or more other SDSs.

In some demonstrative embodiments, a NAN Data Cluster (NDC) 129 may be defined, for example, for NAN data link 149.

In some demonstrative embodiments, the NDC 129 may include a cluster, which includes NAN devices in the same NAN cluster that share a common base schedule (also referred to as "NDC base schedule" or "base schedule").

In one example, the NDC 129 may include NAN devices 102, 140 and/or 160 of NAN cluster 109.

In some demonstrative embodiments, devices of NDC 129 may be configured to determine, set, define, and/or communicate according to an NDC base schedule, e.g., as described below.

In some demonstrative embodiments, a NAN device, e.g., device 102, device 140, device 160, and/or device 180, may be configured to advertise the NDC base schedule, e.g., as described below.

In some demonstrative embodiments, one or more NAN devices, e.g., devices 102, 140, 160 and/or 180, may be configured to join the NDC 129, e.g., as described below.

In some demonstrative embodiments, one or more NAN devices, e.g., devices 102, 140, 160 and/or 180, may be configured to propagate the NDC base schedule, e.g., as described below.

In some demonstrative embodiments, it may not be advantageous to determine a NDC base schedule according to an algorithm in which, when an NDL between two devices is initially formed, the devices decide on a NDC base schedule; whenever a new NDL is formed with another device in the same NDC, a new base schedule is selected that is a subset and a prefix of the original base schedule; and/or when more and more devices join the NDC more and more new base schedules are added.

In some demonstrative embodiments, this algorithm may be very complex and hard to implement.

In one example, according to this algorithm, a device will have its own base schedule, and the peers of a device having an NDL with the device may also change its base schedule after a new NDL is formed. According to this example, the device may need to constantly poll the peers to confirm the base schedule, and to record the different base schedules of its peers.

Some demonstrative embodiments may provide a scheme, which may enable to determine and use an NDC base schedule in a simplified manner, which may be, for example, easy to implement and/or follow.

In some demonstrative embodiments, a device of NDC 129, for example, device 102, may be defined to determine an NDC base schedule, e.g., for all the other NAN devices that will join the NDC, e.g., as described below.

In some demonstrative embodiments, the NDC base schedule may include a series of timeslots and channels that are advertised, for example, through a further availability bitmap in a NAN service descriptor.

In some demonstrative embodiments, the NAN device that determines the NDC base schedule may be, for example, the first NAN device that opens an NDC, for example, due to an NDL the NAN device may have with some other NAN device.

In some demonstrative embodiments, the NAN device, which is to determine the NDC base schedule may be referred to as the NDC anchor device.

In some demonstrative embodiments, one or more other NAN devices, e.g., one or more of devices 102, 140, 160 and/or 180, which wish to join the NDC, e.g., NDC 129, may be configured to adopt the NDC base schedule, and to advertise the NDC base schedule, for example, on demand, e.g., whenever a new NDL is formed, e.g., as described below.

In some demonstrative embodiments, two NAN devices, e.g., devices 102 and/or 140, that are part of the same NAN cluster may setup NDL 149, e.g., to exchange data between device 102 and 140.

In some demonstrative embodiments, controller 124 may be configured to control, cause and/or trigger device 102 to setup the NDL 149 with device 140.

In some demonstrative embodiments, the NDL 149 may belong to NDC 129 having an NDC base schedule.

In some demonstrative embodiments, NDC 129 may include device 102, device 140 and device 160 of NAN cluster 109.

In some demonstrative embodiments, controller 124 may be configured to control, cause and/or trigger device 102 to communicate data with device 140 via the NDL 149 according to the NDC base schedule of NDC 129.

In some demonstrative embodiments, the NDC base schedule of NDC 129 may be determined by an NDC anchor of the NDC 129.

In one example, device 102 may operate as, and/or perform the functionality of, the NDC anchor of NDC 129. According to this example, device 102 may communicate data with device 140 via the NDL 149 according to an NDC base schedule determined by device 102.

In some demonstrative embodiments, controller 124 may be configured to control, cause and/or trigger device 102 to determine the schedule to be used to communicate with the one or more other NAN devices 130 based on the NDC base schedule.

In some demonstrative embodiments, controller 124 may be configured to control, cause and/or trigger device 102 to setup NDC 129 as a new NDC, for example, upon setting up the NDL 149, e.g., as described below.

In some demonstrative embodiments, controller 124 may be configured to control, cause and/or trigger device 102 to setup the NDL 149 in an existing NDC to which at least one of device 102 and device 140 already belongs.

For example, device 102 may setup the NDL 149 in NDC 129, for example, if device 102 already belongs to NDC 129, e.g., as described below.

In some demonstrative embodiments, according to a first scenario, device 102 and device 140 may not be part of the same NDC for the same service, e.g., a service having the same service identifier (ID) as a service identifier of a service corresponding to an existing NDC.

In some demonstrative embodiments, an NDL, e.g., NDL 149, may be formed between device 102 and device 140, for example, when device 102 and device 104 want to use a common service.

In some demonstrative embodiments, device 102 and device 140 may form NDC 129 with an NDC base schedule, for example, since an NDL between device 102 and 140 may be required to be belong to an NDC.

In some demonstrative embodiments, according to the first scenario, the NDC anchor may be determined, set and/or defined based on one or more criteria, e.g., as described below.

In some demonstrative embodiments, the NDC anchor may be the publisher of a service.

In some demonstrative embodiments, a publisher of a service may be a device, which sends a publish message, e.g., a solicited or unsolicited publish, for example, according to a NAN specification.

In some demonstrative embodiments, the NDC anchor may be an unsolicited subscriber to a service.

In some demonstrative embodiments, the NDC anchor may be the initiator of an NDL setup, e.g., the initiator of NDL 149.

In some demonstrative embodiments, the NDC anchor may be defined or selected according to any other additional or alternative parameter, attribute and/or criteria.

In some demonstrative embodiments, an identity of the NDC anchor may be indicated in an NDC attribute, e.g., as described below.

In some demonstrative embodiments, the NDC may be related to a common service or application, which may be shared by the two devices. Accordingly, the NDC may be defined, for example, by a service ID and an identifier of the NDC anchor, and/or based on any other information.

In some demonstrative embodiments, the Service ID may be indicated in the NDC attribute, e.g., as described below.

In some demonstrative embodiments, the NDC base schedule may include a combination of one or more timeslots and one or more channels, which may be, for example, suitable for communication by the NDC anchor.

In some demonstrative embodiments, the NDC base schedule may include, for example, at least one timeslot and at least one channel.

In some demonstrative embodiments, an NDL schedule to communicate over an NDL may be a superset of the NDC base schedule, e.g., determined by the NDC anchor.

In some demonstrative embodiments, controller 124 may be configured to control, cause and/or trigger device 102 to process an NDC attribute.

In some demonstrative embodiments, the NDC attribute may include at least base schedule information of the NDC base schedule.

In one example, device 102 may send the NDC attribute to device 140. In another example, device 102 may receive the NDC attribute from device 140.

In some demonstrative embodiments, the NDC attribute may include a service identifier (ID) of a service to which the NDC refers. For example, the NDC attribute may include a service ID of application 125, e.g., if NDC 129 refers to application 125.

In some demonstrative embodiments, the NDC attribute may include an identifier of an NDC anchor of the NDC 129. For example, the NDC attribute may include an identifier, e.g., a MAC address or any other identifier, of device 102, for example, if device 102 is the NDC anchor of the NDC 129.

In some demonstrative embodiments, the NDC attribute may include a hop count field to indicate a number of hops between a transmitter of the NDC attribute and an NDC anchor of the NDC, e.g., as described below.

In one example, a device, e.g., a device of devices 102, 140 and/or 160, which sets up a NDL with another device, may be configured to maintain a current hop count from the NDC anchor, and may increase the minimum of the current hop count of the device from the NDC anchor by one. The current hop count may be initialized, for example, to 255 (maximum number), or any other value.

In some demonstrative embodiments, the NDC attribute may include a hop count limit field to indicate a maximal number of hops allowed between a NAN device belonging to the NDC 129 and the NDC anchor of the NDC.

In some demonstrative embodiments, the NDC anchor may be configured to limit the NDC size, for example, by using a hop count limitation, e.g., in the hop count limit field In some demonstrative embodiments, an NDC attribute may include one or more of the following fields:

TABLE 1

| Field | Size (octets) | Value | Description |
| --- | --- | --- | --- |
| Attribute ID | 1 | TBD | Identifies the type of NAN attribute. |
| Length | 2 | Variable | Length of the following fields in the attribute. |
| Service ID | 6 | Variable | Service ID this NDC refers to |
| NDC Anchor | 6 | Variable | MAC address of NDC anchor. |
| Hop count | 1 | Variable | The hop from NDC anchor |
| Hop count limit | 1 | Variable | A limitation on the hop count for this NDC |
| Map Control | 1 | Variable | The availability channel and time map control information, as defined in Table 5-17 of the NAN Specification. |
| Availability Intervals Bitmap | Variable | Variable | The Availability Intervals Bitmap divides the time between the beginnings of consecutive Discovery Windows of a given NAN cluster into consecutive time intervals of equal durations. The time interval duration is specified by the Availability Interval Duration subfield of the Map Control field. A NAN device that sets the i-th bit of the Availability Intervals Bitmap to 1 shall be present during the corresponding i-th time interval in the operation channel indicated by the associated Further Availability Map attribute. A NAN device that sets the i-th bit of the Availability Intervals Bitmap to 0 may be present during the corresponding i-th time interval in the operation channel indicated by the associated Further Availability Map attribute. |

In some demonstrative embodiments, the NDC attribute may include one or more additional or alternative fields.

In some demonstrative embodiments, one or more fields of the NDC attribute of Table 1 may be optional. For example, the Service ID, NAN Anchor, and/or Hop Count Limit fields may be optional fields.

In one example, a NAN device may be configured to choose not to include part of the attributes, e.g., one or more of the optional fields, such as, for example, service ID, NAN Anchor, Hop Count limit.

In some demonstrative embodiments, devices 102, 140, 160 and/or 180 may be configured to generate, transmit, receive and/or process one or more messages including the NDC attribute.

In some demonstrative embodiments, according to a second scenario, at least one device of two devices, e.g., device 102 and device 140, may be part of one or more different NDC(s) for the service ID.

In some demonstrative embodiments, when at least one of devices 102 and 140 is part of an NDC for the same service ID, the two devices may choose to open a new NDC, e.g., NDC 129, for the same service, or one of the devices may select join an existing NDC of the other one.

In some demonstrative embodiments, for example, a first device ("the new device"), e.g., device 140, may join an existing NDC of a second device, e.g., device 102. For example, the second device may be the NDC anchor or any other device that is part of the existing NDC. According to these embodiments, the new device joining the NDC shall adopt the NDC base schedule of the existing NDC.

In some demonstrative embodiments, the device joining the NDC may receive the NDC base schedule, for example, as part of the NDL setup, for example, by receiving the NDC attribute, e.g., the NDC attribute of Table 1, from the second device that already belongs to the NDC.

In some demonstrative embodiments, if, for example, the new device is not able to commit, or selects not to commit, to the NDC schedule of the other device, the first and second devices may select to negotiate a new NDC, e.g., as described above with respect to the first scenario.

In some demonstrative embodiments, the second device may accept or reject the request, for example, according to its own resource availability, and/or based on any other criteria.

In some demonstrative embodiments, the NDC anchor device may be configured to be present in the timeslot advertised by the NDC schedule. Other NAN devices that wish to join the NDC of the NDC anchor may setup NDLs in the NDC schedule timeslots.

In some demonstrative embodiments, devices 102, 140, 160 and/or 180 may be configured to tear down an NDC and/or NDL, e.g., as described below. For example, devices 102 and/or 140 may be configured to tear down NDL 149 and/or NDC 129.

In some demonstrative embodiments, an NDL, which was used to setup the NDC, may be torn down.

In one example, an NDL between a first device, which is the NDC anchor, e.g., device 102, and a second device, e.g., device 140, may be torn down, for example, if the NDC anchor does not belong to the NDC anymore, e.g., if the NDC anchor becomes unavailable, or for any other reason.

In some demonstrative embodiments, for example, to maintain simplicity for the tear down, the remaining NDLs in the NDC, e.g., NDLs between device 140 and one or more other devices in the NDC, may simply reuse the existing NDC base schedule, and there may be no need to change the NDC base schedule, e.g., to save signaling overhead.

In some demonstrative embodiments, if device 140 has NDLs with other peers in the same NDC, device 140 may set itself as an NDC anchor of the NDC, e.g., instead of device 102.

In some demonstrative embodiments, device 140 may choose not to update the Hop Count with its peers with NDLs in the same NDC, for example, since an update of NDC parameters such as Hop Count may introduce signaling overhead, e.g., when device 140 replaces device 102.

In some demonstrative embodiments, devices 102, 140, 160 and/or 180 may be configured to update the NDC base schedule.

In some demonstrative embodiments, the NDC case schedule may not be updated frequently, e.g., most of the time, for example, when the NDC is large, e.g., to avoid signaling overhead.

In some demonstrative embodiments, for example, when the NDC is small, e.g., a device is one-hop away from the NDC anchor, a device of the NDC may be configured to send an update request to the NDC anchor.

In some demonstrative embodiments, the NDC anchor may select to initiate a base schedule update, or may select to reject the attempt of update, e.g., in response to the update request.

Figure 2:
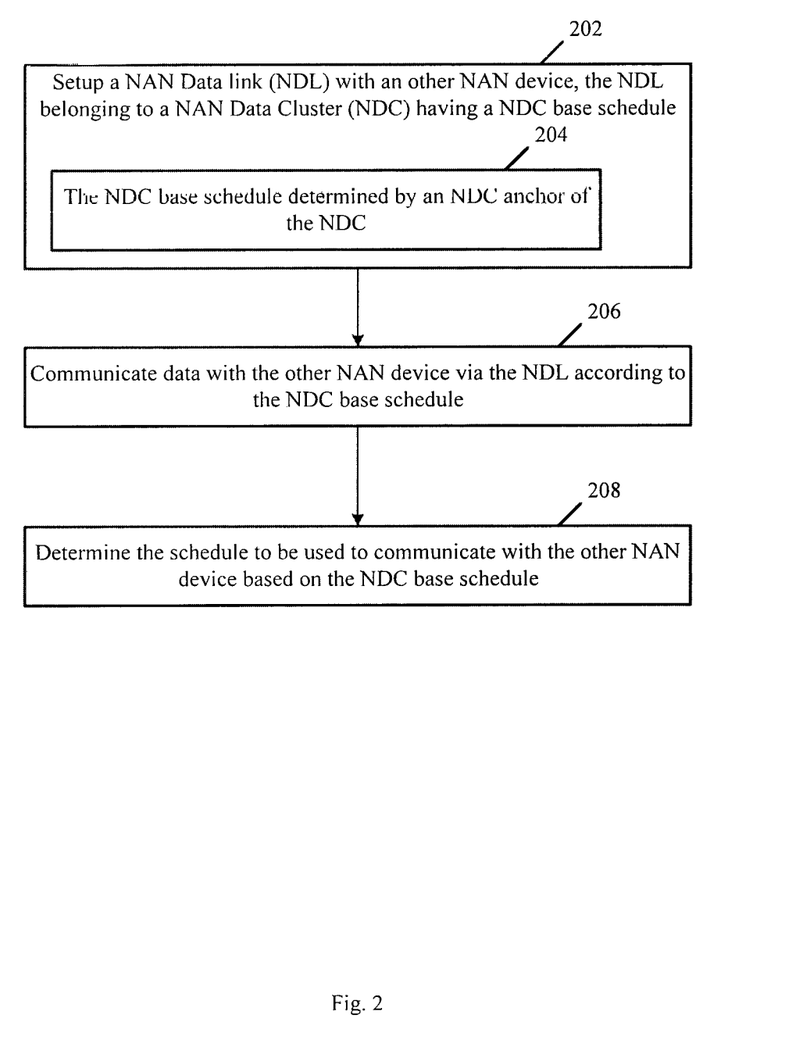
FIG. 2 is a schematic flow-chart illustration of a method of communicating in a Neighbor Awareness Networking (NAN) Cluster, in accordance with some demonstrative embodiments.

Reference is made to FIG. 2, which schematically illustrates a method of communicating in a NAN cluster, in accordance with some demonstrative embodiments. For example, one or more of the operation of FIG. 2 may be performed by one or more elements of a system, system 100 (FIG. 1); a device, e.g., wireless communication devices 102, 140, 160 and/or 180 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 202, the method may include setting up a NAN Data link (NDL) with an other NAN device, the NDL belonging to a NAN Data Cluster (NDC) having a NDC base schedule. For example, controller 124 (FIG. 1) may control, cause and/or trigger device 102 (FIG. 1) to setup NDL 149 (FIG. 1) with NAN device 140 (FIG. 1), the NDL 149 (FIG. 1) belonging to NDC 129 (FIG. 1) having the NDC base schedule, e.g., as described above.

As indicated at block 204, setting up a the NDL may include setting up the NDL belonging to the NDC having an NDC base schedule determined by an NDC anchor of the NDC. For example, controller 124 (FIG. 1) may control, cause and/or trigger device 102 (FIG. 1) to setup NDL 149 (FIG. 1) with NAN device 140 (FIG. 1), the NDL 149 (FIG. 1) belonging to NDC 129 (FIG. 1) having the NDC base schedule determined by device 102 (FIG. 1) the NDC anchor of NDC 129 (FIG. 1), e.g., as described above.

As indicated at block 206, the method may include communicating data with the other NAN device via the NDL according to the NDC base schedule. For example, device 102 and device 140 (FIG. 1) may communicate data via NDL 149 (FIG. 1) according to the NDC base schedule, e.g., as described above.

As indicated at block 208, the method may include determining the schedule to be used to communicate with the other NAN device, e.g., based on the NDC base schedule. For example, controller 124 (FIG. 1) may control, cause and/or trigger device 102 (FIG. 1) to determine the schedule to be used to communicate with the one or more other NAN devices 130 (FIG. 1) based on the NDC base schedule of NDC 129 (FIG. 1), e.g., as described above.

Figure 3:
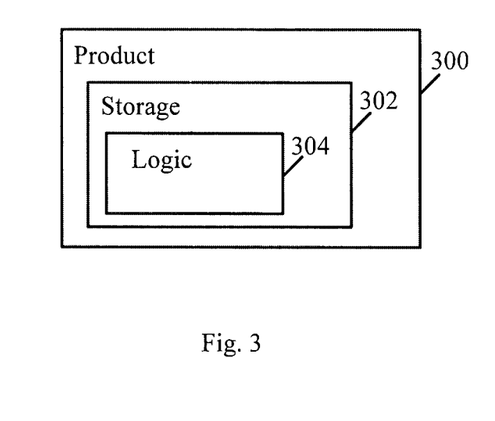
FIG. 3 is a schematic illustration of a product, in accordance with some demonstrative embodiments.

Reference is made to FIG. 3, which schematically illustrates a product of manufacture 300, in accordance with some demonstrative embodiments. Product 300 may include one or more tangible computer-readable non-transitory storage media 302, which may include computer-executable instructions, e.g., implemented by logic 304, operable to, when executed by at least one computer processor, enable the at least one computer processor to implement one or more operations at devices 102, 140, 160 and/or 180 (FIG. 1), radio 114 (FIG. 1), transmitter 118 (FIG. 1), receiver 116 (FIG. 1), controller 124, controller 154 (FIG. 1), message processor 128 (FIG. 1), message processor 158 (FIG. 1), and/or to perform, trigger and/or implement one or more operations and/or functionalities of the FIG. 2, and/or one or more operations described herein. The phrase "non-transitory machine-readable medium" is directed to include all computer-readable media, with the sole exception being a transitory propagating signal.

In some demonstrative embodiments, product 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first Neighbor Awareness Networking (NAN) device to communicate during one or more Discovery Windows (DWs) of a NAN cluster; setup a NAN Data link (NDL) with a second NAN device of the NAN cluster, the NDL belonging to a NAN Data Cluster (NDC) having an NDC base schedule; and communicate data with the second NAN device via the NDL according to an NDL schedule, which is based on the NDC base schedule.

Example 2 includes the subject matter of Example 1, and optionally, wherein the NDC base schedule is determined by an NDC anchor of the NDC.

Example 3 includes the subject matter of Example 1 or 2, and optionally, wherein the apparatus is configured to cause the first NAN device to setup the NDC as a new NDC upon setting up the NDL.

Example 4 includes the subject matter of Example 1 or 2, and optionally, wherein the apparatus is configured to cause the first NAN device to setup the NDL in an existing NDC to which at least one of the first NAN device and the second NAN device belongs.

Example 5 includes the subject matter of any one of Examples 1-4, and optionally, wherein the apparatus is configured to cause the first NAN device to process an NDC attribute comprising at least base schedule information of the NDC base schedule.

Example 6 includes the subject matter of Example 5, and optionally, wherein the NDC attribute comprises a service identifier (ID) of a service to which the NDC refers.

Example 7 includes the subject matter of Example 5 or 6, and optionally, wherein the NDC attribute comprises an identifier of an NDC anchor of the NDC.

Example 8 includes the subject matter of any one of Examples 5-7, and optionally, wherein the NDC attribute comprises a hop count field to indicate a number of hops between a transmitter of the NDC attribute and an NDC anchor of the NDC.

Example 9 includes the subject matter of any one of Examples 5-8, and optionally, wherein the NDC attribute comprises a hop count limit field to indicate a maximal number of hops allowed between a NAN device belonging to the NDC and an NDC anchor of the NDC.

Example 10 includes the subject matter of any one of Examples 1-9, and optionally, comprising one or more antennas, a memory and a processor.

Example 11 includes a system of wireless communication comprising a first Neighbor Awareness Networking (NAN) device, the first NAN device comprising one or more antennas; a memory; a processor; and a controller configured to cause the first NAN device to communicate during one or more Discovery Windows (DWs) of a NAN cluster; setup a NAN Data link (NDL) with a second NAN device of the NAN cluster, the NDL belonging to a NAN Data Cluster (NDC) having an NDC base schedule; and communicate data with the second NAN device via the NDL according to an NDL schedule, which is based on the NDC base schedule.

Example 12 includes the subject matter of Example 11, and optionally, wherein the NDC base schedule is determined by an NDC anchor of the NDC.

Example 13 includes the subject matter of Example 11 or 12, and optionally, wherein the controller is configured to cause the first NAN device to setup the NDC as a new NDC upon setting up the NDL.

Example 14 includes the subject matter of Example 11 or 12, and optionally, wherein the controller is configured to cause the first NAN device to setup the NDL in an existing NDC to which at least one of the first NAN device and the second NAN device belongs.

Example 15 includes the subject matter of any one of Examples 11-14, and optionally, wherein the controller is configured to cause the first NAN device to process an NDC attribute comprising at least base schedule information of the NDC base schedule.

Example 16 includes the subject matter of Example 15, and optionally, wherein the NDC attribute comprises a service identifier (ID) of a service to which the NDC refers.

Example 17 includes the subject matter of Example 15 or 16, and optionally, wherein the NDC attribute comprises an identifier of an NDC anchor of the NDC.

Example 18 includes the subject matter of any one of Examples 15-17, and optionally, wherein the NDC attribute comprises a hop count field to indicate a number of hops between a transmitter of the NDC attribute and an NDC anchor of the NDC.

Example 19 includes the subject matter of any one of Examples 15-18, and optionally, wherein the NDC attribute comprises a hop count limit field to indicate a maximal number of hops allowed between a NAN device belonging to the NDC and an NDC anchor of the NDC.

Example 20 includes a method to be performed at a first Neighbor Awareness Networking (NAN) device, the method comprising communicating during one or more Discovery Windows (DWs) of a NAN cluster; setting up a NAN Data link (NDL) with a second NAN device of the NAN cluster, the NDL belonging to a NAN Data Cluster (NDC) having an NDC base schedule; and communicating data with the second NAN device via the NDL according to an NDL schedule, which is based on the NDC base schedule.

Example 21 includes the subject matter of Example 20, and optionally, wherein the NDC base schedule is determined by an NDC anchor of the NDC.

Example 22 includes the subject matter of Example 20 or 21, and optionally, comprising setting up the NDC as a new NDC upon setting up the NDL.

Example 23 includes the subject matter of Example 20 or 21, and optionally, comprising setting up the NDL in an existing NDC to which at least one of the first NAN device and the second NAN device belongs.

Example 24 includes the subject matter of any one of Examples 20-23, and optionally, comprising processing an NDC attribute comprising at least base schedule information of the NDC base schedule.

Example 25 includes the subject matter of Example 24, and optionally, wherein the NDC attribute comprises a service identifier (ID) of a service to which the NDC refers.

Example 26 includes the subject matter of Example 24 or 25, and optionally, wherein the NDC attribute comprises an identifier of an NDC anchor of the NDC.

Example 27 includes the subject matter of any one of Examples 24-26, and optionally, wherein the NDC attribute comprises a hop count field to indicate a number of hops between a transmitter of the NDC attribute and an NDC anchor of the NDC.

Example 28 includes the subject matter of any one of Examples 24-27, and optionally, wherein the NDC attribute comprises a hop count limit field to indicate a maximal number of hops allowed between a NAN device belonging to the NDC and an NDC anchor of the NDC.

Example 29 includes a product comprising one or more tangible computer-readable non-transitory storage media comprising computer-executable instructions operable to, when executed by at least one computer processor, enable the at least one computer processor to implement one or more operations at a first Neighbor Awareness Networking (NAN) device, the operations comprising communicating during one or more Discovery Windows (DWs) of a NAN cluster; setting up a NAN Data link (NDL) with a second NAN device of the NAN cluster, the NDL belonging to a NAN Data Cluster (NDC) having an NDC base schedule; and communicating data with the second NAN device via the NDL according to an NDL schedule, which is based on the NDC base schedule.

Example 30 includes the subject matter of Example 29, and optionally, wherein the NDC base schedule is determined by an NDC anchor of the NDC.

Example 31 includes the subject matter of Example 29 or 30, and optionally, wherein the operations comprise setting up the NDC as a new NDC upon setting up the NDL.

Example 32 includes the subject matter of Example 29 or 30, and optionally, wherein the operations comprise setting up the NDL in an existing NDC to which at least one of the first NAN device and the second NAN device belongs.

Example 33 includes the subject matter of any one of Examples 29-32, and optionally, wherein the operations comprise processing an NDC attribute comprising at least base schedule information of the NDC base schedule.

Example 34 includes the subject matter of Example 33, and optionally, wherein the NDC attribute comprises a service identifier (ID) of a service to which the NDC refers.

Example 35 includes the subject matter of Example 33 or 34, and optionally, wherein the NDC attribute comprises an identifier of an NDC anchor of the NDC.

Example 36 includes the subject matter of any one of Examples 33-35, and optionally, wherein the NDC attribute comprises a hop count field to indicate a number of hops between a transmitter of the NDC attribute and an NDC anchor of the NDC.

Example 37 includes the subject matter of any one of Examples 33-36, and optionally, wherein the NDC attribute comprises a hop count limit field to indicate a maximal number of hops allowed between a NAN device belonging to the NDC and an NDC anchor of the NDC.

Example 38 includes an apparatus of a first Neighbor Awareness Networking (NAN) device, the apparatus comprising means for communicating during one or more Discovery Windows (DWs) of a NAN cluster; means for setting up a NAN Data link (NDL) with a second NAN device of the NAN cluster, the NDL belonging to a NAN Data Cluster (NDC) having an NDC base schedule; and means for communicating data with the second NAN device via the NDL according to an NDL schedule, which is based on the NDC base schedule.

Example 39 includes the subject matter of Example 38, and optionally, wherein the NDC base schedule is determined by an NDC anchor of the NDC.

Example 40 includes the subject matter of Example 38 or 39, and optionally, comprising means for setting up the NDC as a new NDC upon setting up the NDL.

Example 41 includes the subject matter of Example 38 or 39, and optionally, comprising means for setting up the NDL in an existing NDC to which at least one of the first NAN device and the second NAN device belongs.

Example 42 includes the subject matter of any one of Examples 38-41, and optionally, comprising means for processing an NDC attribute comprising at least base schedule information of the NDC base schedule.

Example 43 includes the subject matter of Example 42, and optionally, wherein the NDC attribute comprises a service identifier (ID) of a service to which the NDC refers.

Example 44 includes the subject matter of Example 42 or 43, and optionally, wherein the NDC attribute comprises an identifier of an NDC anchor of the NDC.

Example 45 includes the subject matter of any one of Examples 42-44, and optionally, wherein the NDC attribute comprises a hop count field to indicate a number of hops between a transmitter of the NDC attribute and an NDC anchor of the NDC.

Example 46 includes the subject matter of any one of Examples 42-45, and optionally, wherein the NDC attribute comprises a hop count limit field to indicate a maximal number of hops allowed between a NAN device belonging to the NDC and an NDC anchor of the NDC.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first Neighbor Awareness Networking (NAN) device to:

communicate during one or more Discovery Windows (DWs) of a NAN cluster;

communicate a first message with a second NAN device of the NAN cluster to setup a NAN Data link (NDL) with the second NAN device, the NDL belonging to a NAN Data Cluster (NDC) having an NDC base schedule determined by an NDC anchor of said NDC, the first message comprising a first NDC attribute comprising at least base schedule information of the NDC base schedule determined by the NDC anchor;

communicate data with the second NAN device via the NDL according to an NDL schedule, which is based on the NDC base schedule; and communicate a second message with a third NAN device, which is to join the NAN cluster, the second message comprising a second NDC attribute comprising the base schedule information of the NDC base schedule determined by the NDC anchor, wherein at least one of the first NDC attribute or the second NDC attribute comprises a hop count limit field to indicate a maximal number of hops allowed between a NAN device belonging to the NDC and the NDC anchor of the NDC.

2. The apparatus of claim 1, wherein the same NDC base schedule is for scheduling communication of all NAN devices joining the NDC.

3. The apparatus of claim 1 configured to cause the first NAN device to setup the NDC as a new NDC upon setting up the NDL.

4. The apparatus of claim 1 configured to cause the first NAN device to setup the NDL in an existing NDC to which at least one of the first NAN device and the second NAN device belongs.

5. The apparatus of claim 1 configured to cause the first NAN device to setup an other NDL with the third NAN device, the other NDL belonging to the NDC having the NDC base schedule determined by the NDC anchor, and to communicate data with the third NAN device via the other NDL according to an other NDL schedule, which is based on the NDC base schedule determined by the NDC anchor.

6. The apparatus of claim 1, wherein at least one of the first NDC attribute or the second NDC attribute comprises a service identifier (ID) of a service to which the NDC refers.

7. The apparatus of claim 1, wherein at least one of the first NDC attribute or the second NDC attribute comprises an identifier of the NDC anchor of said NDC.

8. The apparatus of claim 1, wherein the first NDC attribute comprises a hop count field to indicate a number of hops between a transmitter of the first NDC attribute and the NDC anchor of said NDC.

9. The apparatus of claim 1 comprising one or more antennas, a memory and a processor.

10. A system of wireless communication comprising a first Neighbor Awareness Networking (NAN) device, the first NAN device comprising:
   one or more antennas;
   a memory;
   a processor; and
   a controller configured to cause the first NAN device to:
      communicate during one or more Discovery Windows (DWs) of a NAN cluster;
      communicate a first message with a second NAN device of the NAN cluster to setup a NAN Data link (NDL) with the second NAN device, the NDL belonging to a NAN Data Cluster (NDC) having an NDC base schedule determined by an NDC anchor of said NDC, the first message comprising a first NDC attribute comprising at least base schedule information of the NDC base schedule determined by the NDC anchor;
      communicate data with the second NAN device via the NDL according to an NDL schedule, which is based on the NDC base schedule; and
      communicate a second message with a third NAN device, which is to join the NAN cluster, the second message comprising a second NDC attribute comprising the base schedule information of the NDC base schedule determined by the NDC anchor, wherein at least one of the first NDC attribute or the second NDC attribute comprises a hop count limit field to indicate a maximal number of hops allowed between a NAN device belonging to the NDC and the NDC anchor of the NDC.

11. The system of claim 10, wherein the controller is configured to cause the first NAN device to setup an other NDL with the third NAN device, the other NDL belonging to the NDC having the NDC base schedule determined by the NDC anchor, and to communicate data with the third NAN device via the other NDL according to an other NDL schedule, which is based on the NDC base schedule determined by the NDC anchor.

12. The system of claim 10, wherein at least one of the first NDC attribute or the second NDC attribute comprises an identifier of the NDC anchor of said NDC.

13. A method to be performed at a first Neighbor Awareness Networking (NAN) device, the method comprising:
   communicating during one or more Discovery Windows (DWs) of a NAN cluster;
   communicating a first message with a second NAN device of the NAN cluster to setup up a NAN Data link (NDL) with the second NAN device of the NAN cluster, the NDL belonging to a NAN Data Cluster (NDC) having an NDC base schedule determined by an NDC anchor of said NDC, the first message comprising a first NDC attribute comprising at least base schedule information of the NDC base schedule determined by the NDC anchor;
   communicating data with the second NAN device via the NDL according to an NDL schedule, which is based on the NDC base schedule; and
   communicating a second message with a third NAN device, which is to join the NAN cluster, the second message comprising a second NDC attribute comprising the base schedule information of the NDC base schedule determined by the NDC anchor, wherein at least one of the first NDC attribute or the second NDC attribute comprises a hop count limit field to indicate a maximal number of hops allowed between a NAN device belonging to the NDC and the NDC anchor of the NDC.

14. The method of claim 13 comprising setting up an other NDL with the third NAN device, the other NDL belonging to the NDC having the NDC base schedule determined by the NDC anchor, and communicating data with the third NAN device via the other NDL according to an other NDL schedule, which is based on the NDC base schedule determined by the NDC anchor.

15. The method of claim 13, wherein the first NDC attribute comprises a hop count field to indicate a number of hops between a transmitter of the first NDC attribute and the NDC anchor of said NDC.

16. A product comprising one or more tangible computer-readable non-transitory storage media comprising computer-executable instructions operable to, when executed by at least one processor, enable the at least one processor to cause a first Neighbor Awareness Networking (NAN) device to:
   communicate during one or more Discovery Windows (DWs) of a NAN cluster;
   communicate a first message with a second NAN device of the NAN cluster to setup up a NAN Data link (NDL) with the second NAN device of the NAN cluster, the NDL belonging to a NAN Data Cluster (NDC) having an NDC base schedule determined by an NDC anchor of said NDC, the first message comprising a first NDC attribute comprising at least base schedule information of the NDC base schedule determined by the NDC anchor;
   communicate data with the second NAN device via the NDL according to an NDL schedule, which is based on the NDC base schedule; and
   communicate a second message with a third NAN device, which is to join the NAN cluster, the second message comprising a second NDC attribute comprising the base schedule information of the NDC base schedule determined by the NDC anchor, wherein at least one of the first NBC attribute or the second NBC attribute comprises a hop count limit field to indicate a maximal number of hops allowed between a NAN device belonging to the NDC and the NBC anchor of the NBC.

17. The product of claim 16, wherein the same NDC base schedule is for scheduling communication of all NAN devices joining the NDC.

18. The product of claim 16, wherein the instructions, when executed, cause the first NAN device to set up the NDC as a new NDC upon setting up the NDL.

19. The product of claim 16, wherein the instructions, when executed, cause the first NAN device to set up the NDL in an existing NDC to which at least one of the first NAN device and the second NAN device belongs.

20. The product of claim 16, wherein the instructions, when executed, cause the first NAN device to setup an other NDL with the third NAN device, the other NDL belonging to the NDC having the NDC base schedule determined by the NDC anchor, and to communicate data with the third NAN device via the other NDL according to an other NDL schedule, which is based on the NDC base schedule determined by the NDC anchor.

21. The product of claim 16, wherein at least one of the first NDC attribute or the second NDC attribute comprises a service identifier (ID) of a service to which the NDC refers.

22. The product of claim 16, wherein at least one of the first NDC attribute or the second NDC attribute comprises an identifier of the NDC anchor of said NDC.

23. The product of claim 16, wherein the first NDC attribute comprises a hop count field to indicate a number of hops between a transmitter of the first NDC attribute and the NDC anchor of said NDC.

\* \* \* \* \*

UNITED STATES PATENT AND TRADEMARK OFFICE
CERTIFICATE OF CORRECTION

PATENT NO. : 10,149,313 B2
APPLICATION NO. : 14/757981
DATED : December 4, 2018
INVENTOR(S) : Elad Oren et al.

Page 1 of 1

It is certified that error appears in the above-identified patent and that said Letters Patent is hereby corrected as shown below:

In the Claims

In Column 26, Line 60, in Claim 16, delete "first NBC attribute or the second NBC attribute" and insert --first NDC attribute or the second NDC attribute--, therefor.

In Column 26, Line 63, in Claim 16, delete "and the NBC anchor of the NBC." and insert --and the NDC anchor of the NDC.--, therefor.

Signed and Sealed this
Fifteenth Day of January, 2019

Andrei Iancu
*Director of the United States Patent and Trademark Office*